(12) United States Patent  
Leventhal (10) Patent No.: US 9,369,559 B1  
(45) Date of Patent: Jun. 14, 2016

(54) PORTABLE BLUETOOTH SPEAKER SYSTEM FOR SMART PHONES

(71) Applicant: Robert D. Leventhal, Los Angeles, CA (US)

(72) Inventor: Robert D. Leventhal, Los Angeles, CA (US)

( * ) Notice: Subject to any disclaimer, the term of this patent is extended or adjusted under 35 U.S.C. 154(b) by 0 days.

(21) Appl. No.: 14/748,288

(22) Filed: Jun. 24, 2015

Related U.S. Application Data

(60) Provisional application No. 62/020,376, filed on Jul. 2, 2014.

(51) Int. Cl.
  *H04M 1/00* (2006.01)
  *H04M 1/60* (2006.01)

(52) U.S. Cl.
  CPC .................................. *H04M 1/6041* (2013.01)

(58) Field of Classification Search
  CPC .. H04R 1/1008; H04R 2225/55; H04R 27/00; H04R 19/013; H04R 1/10; H04R 1/1016; H04R 2201/023; H04R 2225/021; H04W 16/26; H04W 16/32; H04W 88/085; H04W 84/14; H04W 88/02; H04W 4/18; H04W 84/18
  USPC ........................ 455/569.1, 571, 572; 381/107
  See application file for complete search history.

*Primary Examiner* — Shaima Q Aminzay  
(74) *Attorney, Agent, or Firm* — Jerry Fong (57) ABSTRACT

A speaker system connects to a Smartphone by utilizing Bluetooth for amplifying the sound quality from the Smartphone. In the case of the Bluetooth speaker system, the Smartphone or other device transmits to the speaker system which uses its built-in amplifier and speaker for playback. This allows the user to enjoy much better sound quality than what's produced by tiny built-in speakers on the Smartphone. The speaker system is portable and also functions as a cradle to secure the Smartphone thereto. The speaker system can be a hands free device.

20 Claims, 8 Drawing Sheets

PORTABLE BLUETOOTH SPEAKER SYSTEM FOR SMART PHONES

BACKGROUND OF THE INVENTION

1. Field of the Invention

The present invention relates generally to the field of speakers. More particularly, the present invention relates to a Bluetooth speaker system for securing, holding and amplifying the sound of the Smartphone or other mobile devices.

2. Description of the Prior Art

Mobile devices such as cellular telephones, Smartphone and other handheld devices have become popular over the years. Numerous types of handheld electronic devices are known. These devices have become smaller and smaller over the years. One of the common problems with these small handheld electronic devices is that sound quality is very dreadful. The tiny built-in speaker sometimes causes sound being distorted, muffled, staticky or crackling during calls. This only seems to happen when speakerphone is enabled.

It is desirable to have a very efficient and also very effective design and construction of a Bluetooth speaker system which can be portable and for providing improved sound quality than what's produced by the OEM tiny built-in speaker from the prior art smart phone.

It is further desirable to provide a speaker system with Bluetooth technology so connecting to the Smartphone is wireless.

SUMMARY OF THE INVENTION

The present invention is a portable Bluetooth speaker system for wireless connecting to a Smartphone and amplifying the sound quality. The speaker system can be utilized as a hands free device. The portable Bluetooth speaker system is great for enjoying the media on the Smartphone. The speaker system functions by utilizing Bluetooth technology to connect to a Smartphone. Bluetooth is simply a wireless technology that lets two devices talk to each other. In the case of the Bluetooth speaker system, the Smartphone or other device transmits to the Bluetooth speaker system which uses its built-in amplifier and speaker for playback. This allows the user to enjoy much better sound quality than what's produced by tiny built-in speakers on the Smartphone. Connecting, or pairing, the Smartphone to the Bluetooth speaker system is a simple one time operation. The present invention speaker system can remember and recognize the Smartphone when it's in range. So after the initial pairing, turn the speaker system on and the speaker system is ready to listen.

It is an object of the present invention to provide a new and improved speaker system for producing improved sound quality connected to a Smartphone.

It is also an object of the present invention to provide a new and improved speaker system that is portable.

It is an additional object of the present invention to provide a new and improved speaker system which does not prevent features of the Smartphone from being utilized.

It is a further object of the present invention to provide a new and improved speaker system utilizing Bluetooth technology for wireless connecting to a Smartphone.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated.

DETAILED DESCRIPTION OF THE PREFERRED EMBODIMENTS

In the following description of the preferred embodiment, reference is made to the accompanying drawings which form a part hereof, and in which is shown by way of illustration a specific embodiment in which the present invention may be practiced. It is to be understood that other embodiments may be utilized and structural changes may be made without departing from the scope of the present invention.

Figure 1:
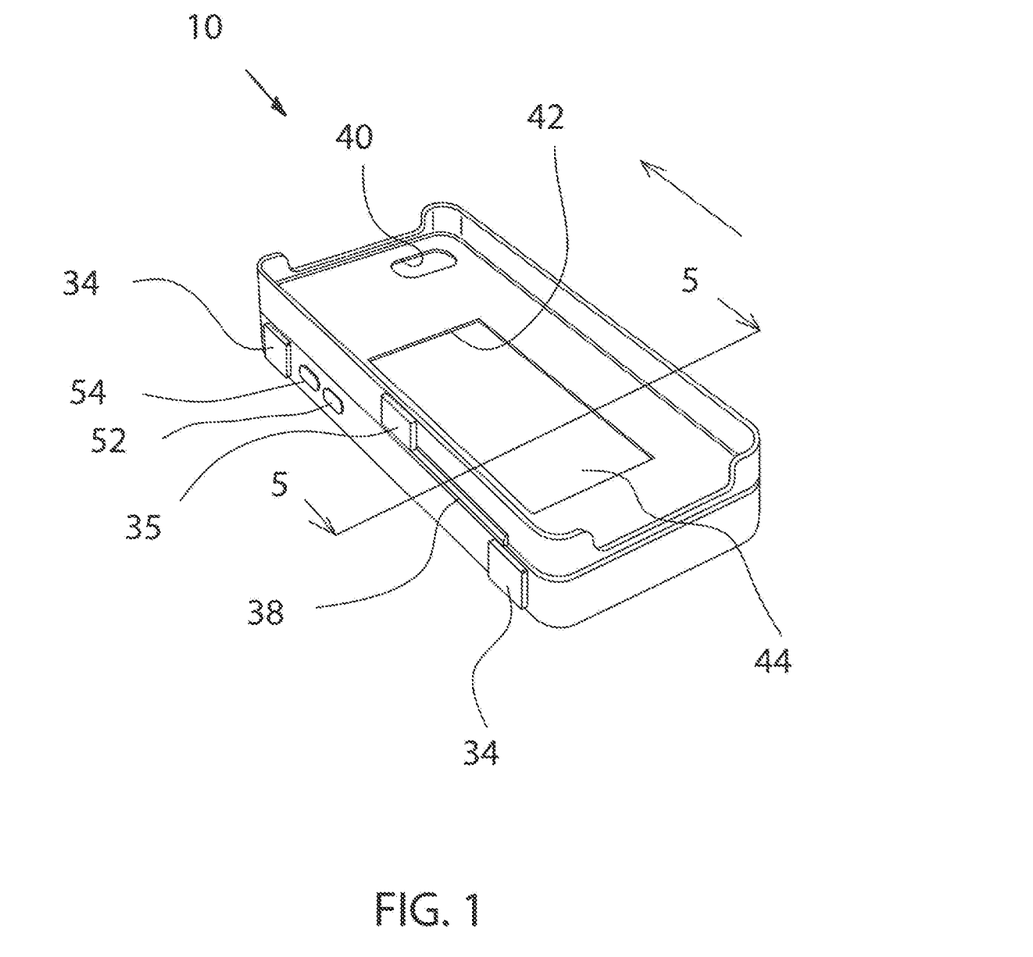
FIG. 1 is a perspective view of a portable Bluetooth speaker system according to an illustrative embodiment of the invention.
Figure 2:
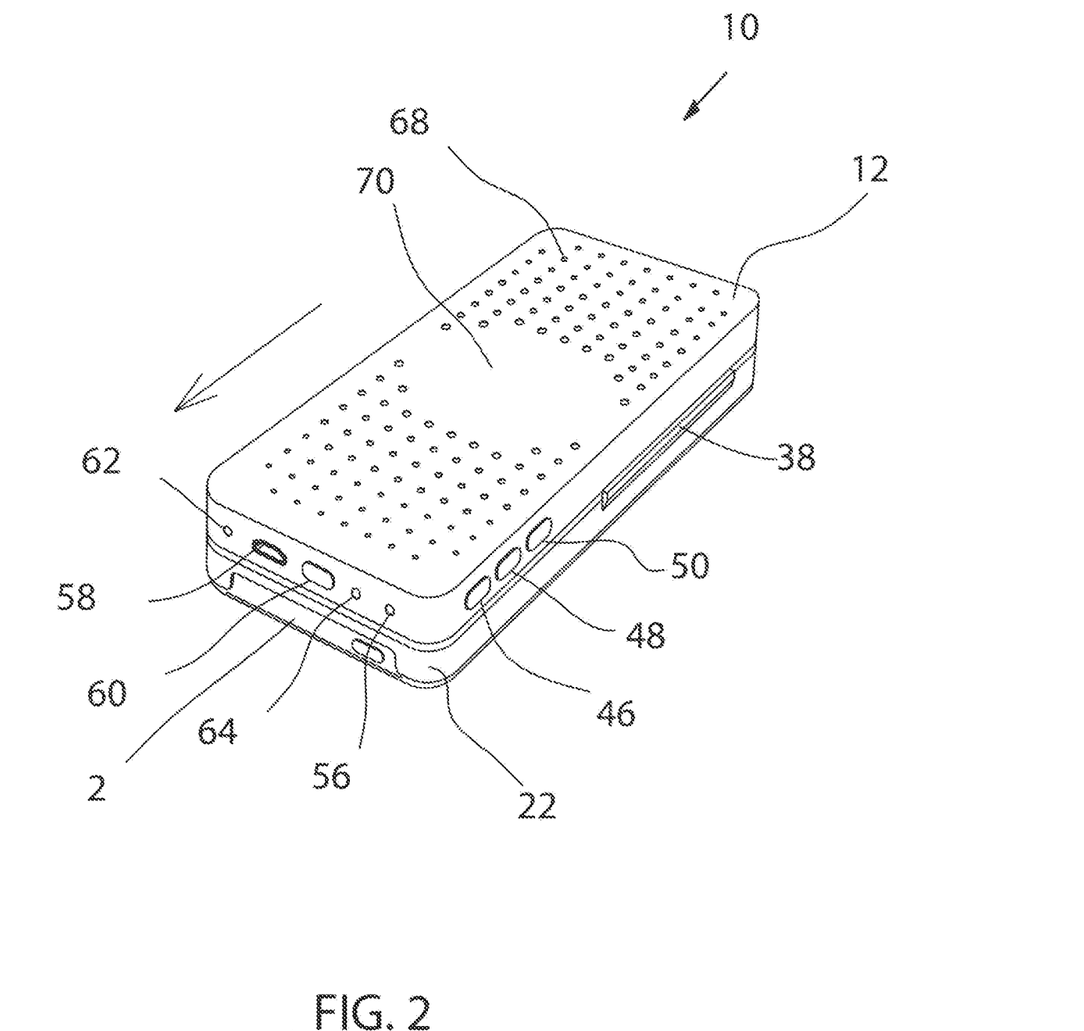
FIG. 2 shows the portable Bluetooth speaker system holding a Smartphone according to an illustrative embodiment of the invention.
Figure 3:
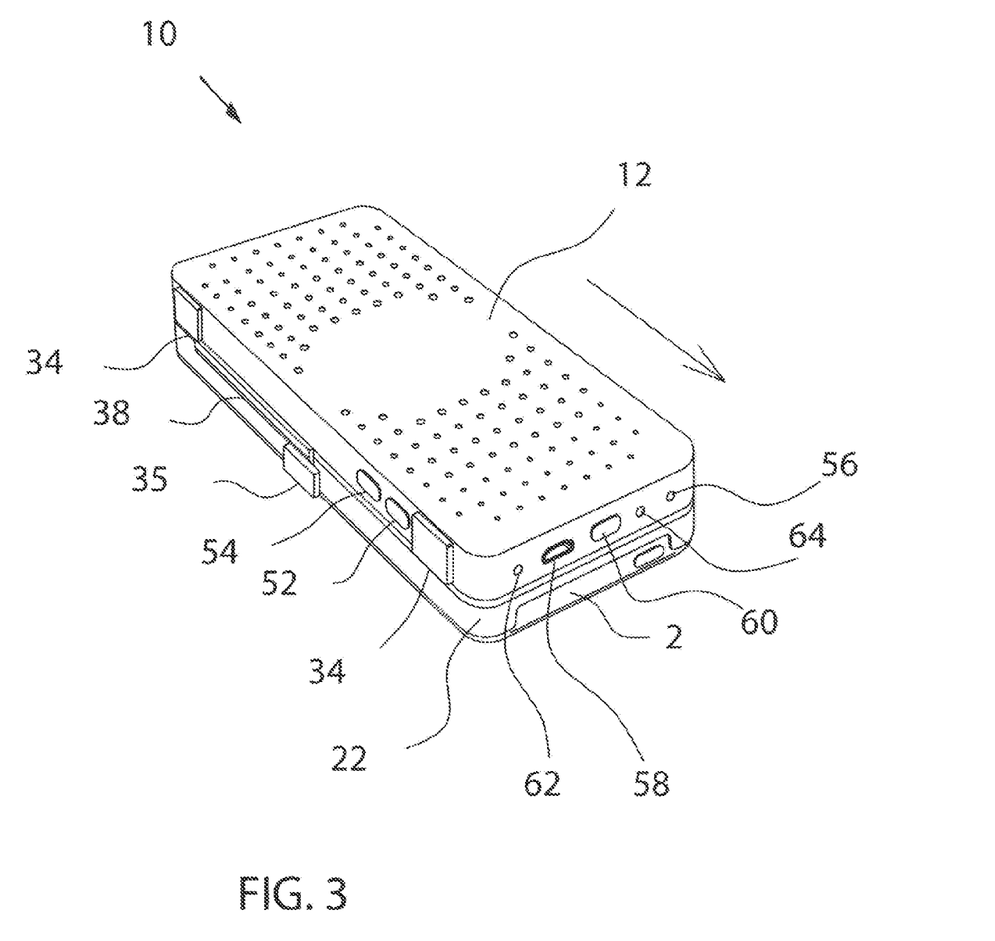
FIG. 3 shows the portable Bluetooth speaker system holding the Smartphone, showing rubber isolation pads according to an illustrative embodiment of the invention.

Referring to FIGS. 1, 2 and 3, there is shown an embodiment of the present invention of a portable Bluetooth speaker system 10 to be used with a Smartphone or other mobile devices 2. The present invention portable Bluetooth speaker system 10 is rechargeable and allows a user to wirelessly stream music from the Smartphone or other Bluetooth enabled devices. It delivers incredible sound from a speaker and is easy to move around because it secures the Smartphone within a cradle. It is compact, lightweight and flexible. The Bluetooth speaker system 10 has the ability to be used as a conference phone. The speaker system 10 comprises a cover or grille 12, soft foam 14, a composite speaker diaphragm 28, a cabinet or housing 18, and a snap cradle 22. The grille 12 includes a plurality of shaped transmission holes 68 which are aesthetic. The entire surface of the cover 12 does not need to be populated with holes 68 (as a typical cone speaker) because of the unique combination. The grille 12 is sturdy and durable. The grille 12 conforms to conventional forms of manufacture, and is of simple construction and is easy to use. The sound pressure level is not affected by the reduction of the transmission holes due to this unique design. This allows for use of non-perforated surface space 70 to fix images such as brand logo. The grille 12 can be made of stainless steel, plastic material or other metal materials.

Figure 4:
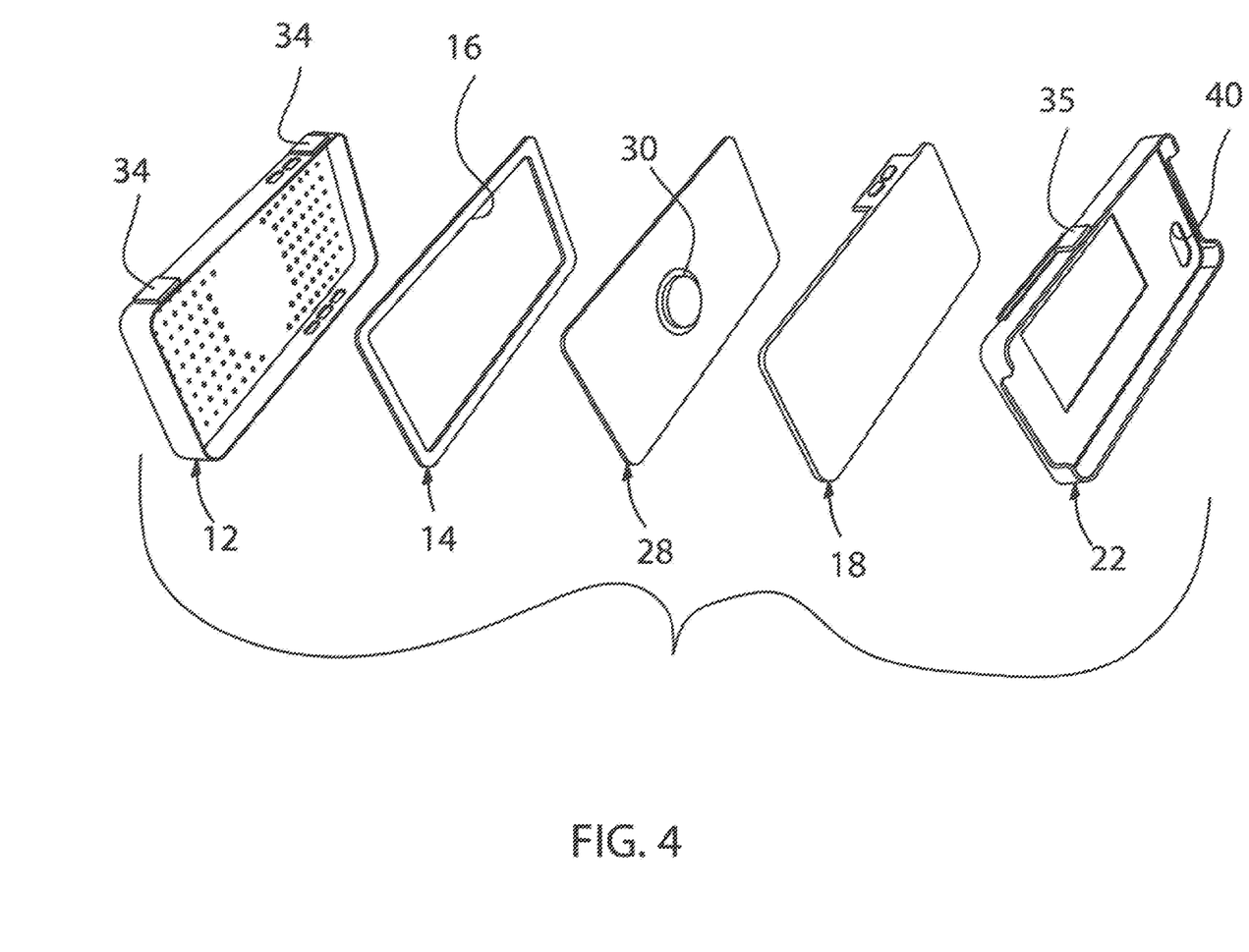
FIG. 4 is an exploded view of the portable Bluetooth speaker system according to an illustrative embodiment of the invention.
Figure 5:
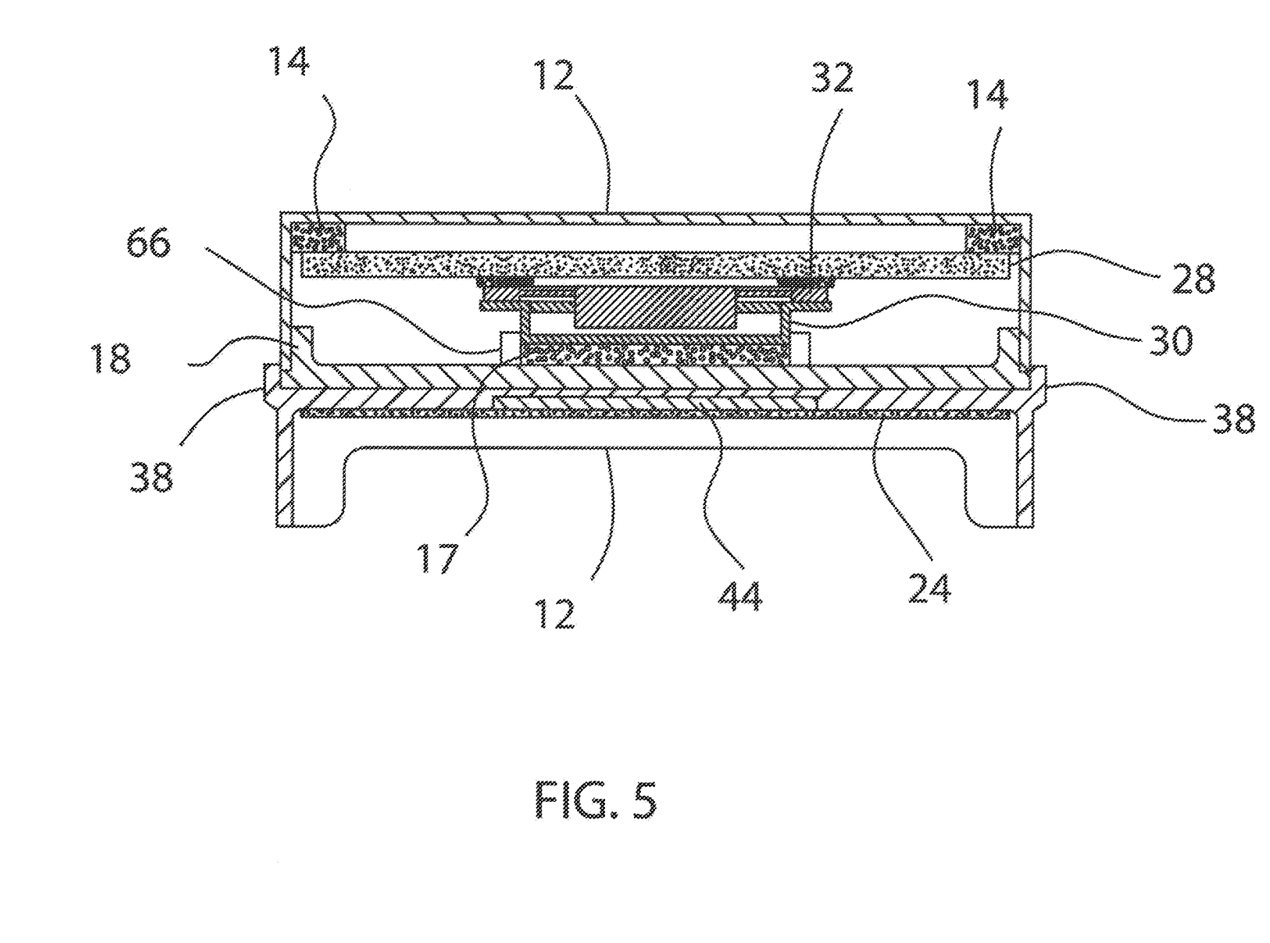
FIG. 5 is a cross-sectional view taken along line 5-5 of FIG. 1 according to an illustrative embodiment of the invention.
Figure 6:
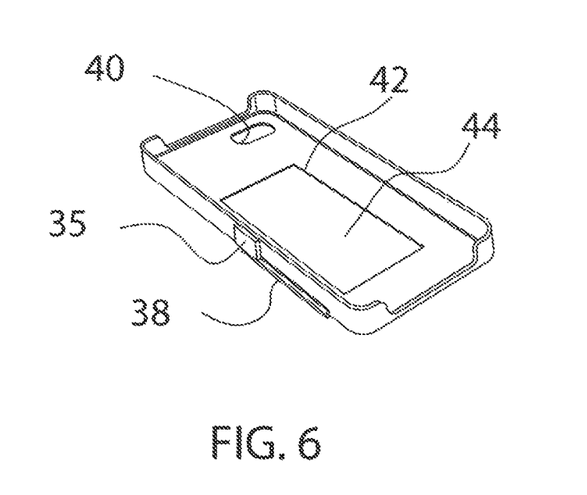
FIG. 6 shows a perspective view of a snap cradle according to an illustrative embodiment of the invention.

Referring to FIGS. 4 and 5, the soft foam 14 is a double sided foam tape which is installed and secured within the interior of the grille 12. The double sided foam tape 14 has an interior opening 16 which is shaped like a rectangle. The foam core double sided tape 14 anchors the composite speaker diaphragm 28 to the top of the cover 12.

An exciter or transducer 30 is centrally mounted to the composite speaker diaphragm 28 by a double sided tape 32. The diaphragm 28 is comprised of a laminated composite of resin impregnated paper top and bottom skins with a core of special engineered plastic foam material. The resin impregnated paper skins are 2 sided. Overall composite diaphragm 28 has a thickness of approximately 1 mm and the core is made out of polymethacrylimide (PMI) foam. Other materials can be used for the diaphragm 28. The Exciter 30 is a high excursion exciter. It is a very low profile audio exciter (electro dynamic transducer) designed with a low profile plastic suspension to conserve space so that the speaker depth can be reduced to as little as 10 mm in thickness. The exciter 30 is approximately 7.40 mm in thickness. The exciter 30 may also be manufactured using plastic spiders that allow for very efficient movement (maximum 2 mm excursion) and exert force in a very compacted space. The voice coil diameter is 25.4 mm and the attachment ring (to diaphragm) 27.5 mm diameter which creates a very uniform and efficient transfer of energy to the diaphragm which is approximately 50 mm by 120 mm when the exciter 30 is located centrally on the diaphragm 28. These combined features of the exciter 30 contribute to reduction in the thickness of the speaker.

Figure 8:
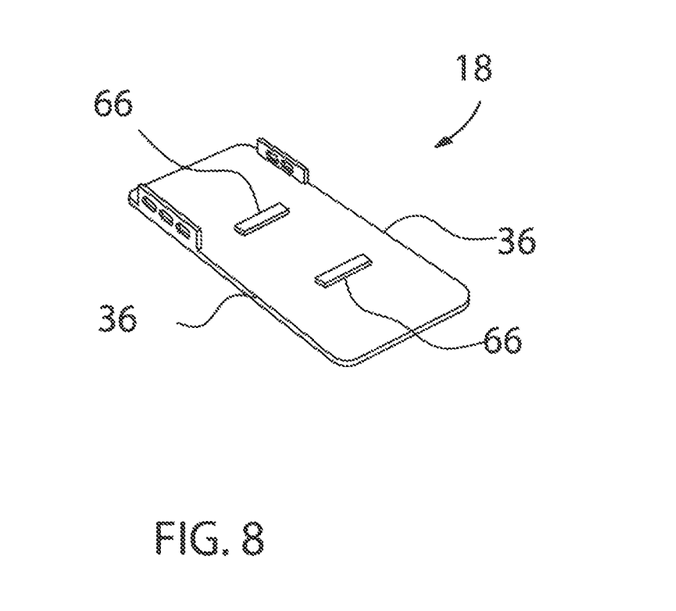
FIG. 8 shows the interior of a cabinet or housing according to an illustrative embodiment of the invention.
Figures 9, 10:
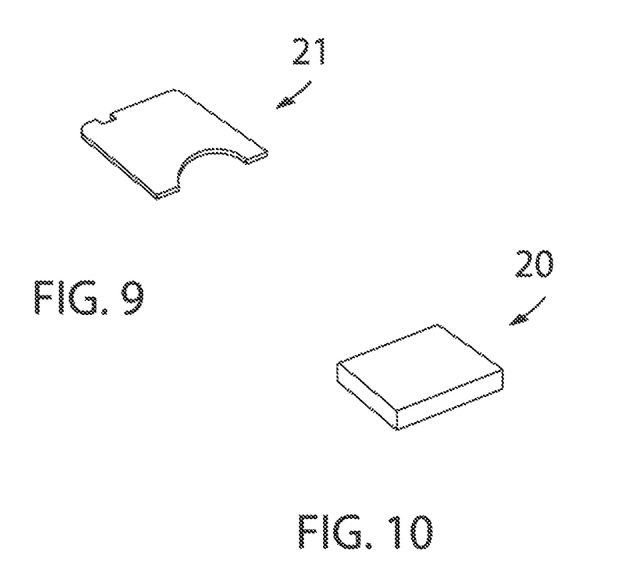
FIG. 9 shows a printed circuit board assembly according to an illustrative embodiment of the invention.
FIG. 10 shows a lithium ion battery according to an illustrative embodiment of the invention.

Referring to FIGS. 4, 5, and 8, there is shown the cabinet or housing 18 which includes two horizontal parallel neodymium magnet strips 66 engaging with a metal plate 44 for securing the snap cradle 22 to the cabinet 18. The magnet strips 66 are installed and secured inside the speaker cabinet 18. A double sided adhesive tape 17 attaches the exciter 30 to the interior of the cabinet 18 and located between the two magnet strips 66. The cabinet 18 houses a printed circuit board assembly (PCBA) 21 which is located in the upper portion of the housing and a rechargeable lithium polymer battery or lithium ion battery 20 which is located and secured at the lower portion of the housing 18. The PCBA 21 mechanically supports and electrically connects electronic components of the Bluetooth speaker system 10. The system contains all the electronic circuitry necessary for the present invention Bluetooth speaker system 10 to function. The cabinet 18 further comprises a next play button 46 for advancing to the next play file, a speaker phone/pause button 48 for answering the speaker phone/pause play, a previous play button 50 for returning to the previous play file, an increase volume control button 52, a decrease volume control button 54, a microphone aperture 56 for allowing the user to make and take calls from the Smartphone which is connected to the Bluetooth speaker system 10, a mini USB 58 for charging and providing auxiliary audio input jack, and a power button 60 for turning on and off the speaker system 10.

Referring to FIGS. 2 and 3, there is shown a first LED 62 which is used as a battery indicator. The first LED 62 displays a status of either a red light or a green light. The red light indicates the Bluetooth speaker system 10 is charging while the green light indicates a fully charged battery. If no charger is connected to the speaker system 10 through the mini USB 58, there is no light emitting. When the speaker system 10 is connected to a smart fast charger on the mini USB 58, the first LED 62 emits a continuous red light. When the charging level is considered maximum, the green light illuminates.

A second LED 64 functions as a power and Bluetooth indicator and displays a blue light. After pressing the power button 60 to turn on the speaker system 10, the second LED 64 blinks slowly if there is no Bluetooth connection. After the Bluetooth connection is established, the LED 64 remains in a continuous blue light. When the lithium polymer battery 20 reaches a low battery condition, the LED 64 blinks rapidly for a few seconds and then an audible alarm is produced from the speaker.

Referring to FIGS. 1, 4, 5, and 6, there is shown the snap cradle 22 for securing the Smartphone or other mobile devices. The snap cradle 22 is secured to the exterior side of the cabinet or housing 18. What is unique about the snap cradle 22 is that it can travel on the sides 36 of the cabinet 18 in a linearly movement to allow access to a camera lens of the Smartphone. The lens aperture 40 of the snap cradle 22 allows the Smartphone camera lens access to take a picture without taking the Smartphone off the snap cradle 22. The snap cradle 22 has an interior recess 42 shaped like a rectangle for housing and securing a metal plate 44 thereto. The recess 42 is elongated for accommodating the metal plate 44. This metal plate 44 functions with the two horizontal parallel neodymium magnet strips 66 for allowing the snap cradle 22 to move linearly. A sliding mechanism permits the easy exposure and usage of the camera feature from the Smartphone. The siding mechanism comprises of opposite side ribs 38 located at the lower end of the snap cradle 22 and respectively engage the sides 36 of the cabinet 18 for limited linear travel of the snap cradle 22 on the cabinet 18 and prevents the snap cradle 22 from coming off the speaker cabinet 18. These side ribs 38 are long narrow ribs on the snap cradle 22 for allowing the camera lens from a Smartphone to be unhidden to take pictures.

Figure 7:
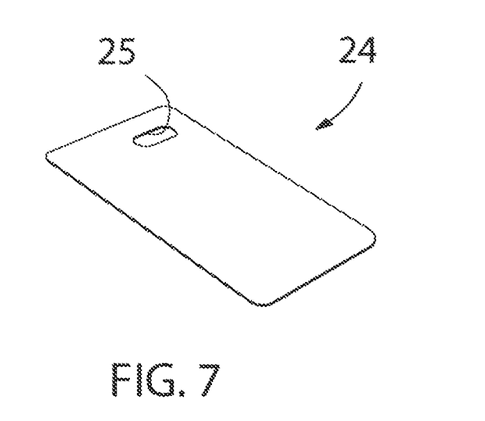
FIG. 7 shows a perspective view of a polycarbonate overlay according to an illustrative embodiment of the invention.

Referring to FIG. 7, there is shown polycarbonate (PVC) overlay 24 with a lens aperture 25. The PVC overlay 24 is of the same size of the entire interior surface of the snap cradle 22. The overlay 24 is installed within the interior of the snap cover 22 and covers the metal plate 44 and the entire interior surface, after the metal plate 44 has been installed. The PVC overlay 24 functions as an ornamental surface and provides some shock absorption protection for the Smartphone.

Referring to FIGS. 1, 3, 4, and 6, there are shown two rubber isolation pads 34 located on the grille 12 and one rubber isolation pad 35 located on the snap cradle 22. These three independent pads 34 and 35 are used to place the speaker system 10 upright on its side edge and isolate the device from resting surface. The rubber isolation pads 34 and 35 prevent vibration noise produced by the speaker resting on a hard surface when the speaker system is in operation.

Figure 11:
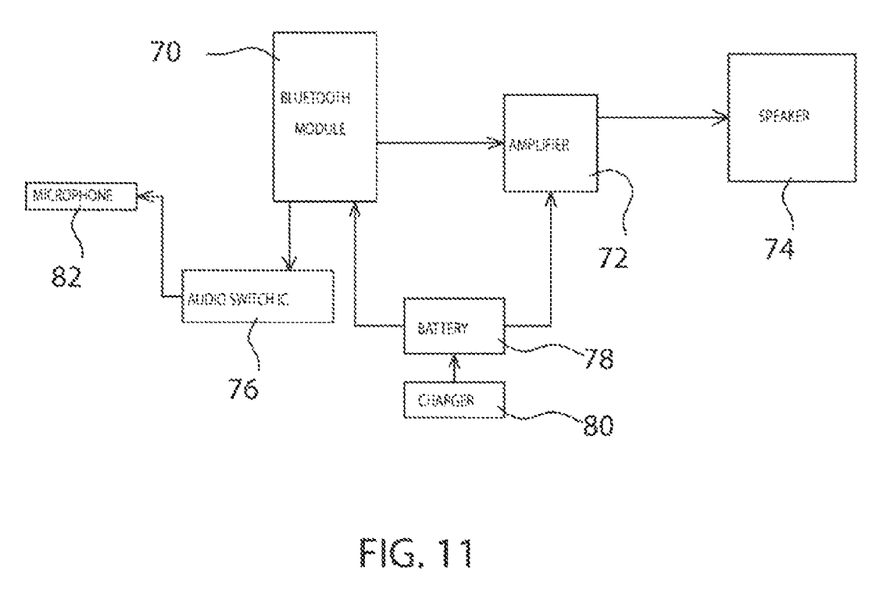
FIG. 11 shows a functional block diagram the portable Bluetooth speaker system according to an illustrative embodiment of the invention.

Referring to FIG. 11, there is shown a simplified functional block diagram of the Bluetooth speaker system according to an illustrative embodiment of the invention. The Bluetooth speaker system may include a Bluetooth module 70, an amplifier 72, a speaker module 74, an audio switch 76, a battery module 78, a battery charging module 80, and a microphone module 82. These modules are all electrically connected. All of the modules are on the PCBA 21 and are known in the art and will not be described.

Bluetooth is simply a wireless technology that lets two devices talk to each other. In the case of Bluetooth speaker system, the Smartphone or other device transmits to the Bluetooth speaker system 10 which uses its built-in amplifier and speaker for playback. This allows the user to enjoy much better sound quality than what's produced by tiny built-in speakers on the Smartphone. Connecting, or pairing, the Smartphone to the Bluetooth speaker system 10 is a simple one time operation. The present invention portable Bluetooth speaker system 10 will remember and recognize the Smartphone when it's in range. So after the initial pairing, turn the speaker system on and the speaker system is ready to listen.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A Bluetooth speaker system used in conjunction with a mobile device for providing a hands-free wireless speaker system to the mobile device, the system comprising:
   a. a grille having a recess;
   b. a foam installed and secured within said recess of said grille;
   c. a diaphragm having a transducer, the diaphragm installed and secured within said recess of said grille;
   d. a cabinet installed and secured within said recess of said grille and located adjacent to said diaphragm, the cabinet having a pair of lateral and parallel magnet strips;
   e. a cradle having a recess for receiving said mobile device;
   f. means for coupling said cradle to said cabinet and preventing said cradle from coming off said cabinet;
   g. a sliding mechanism for allowing the camera lens from said mobile device to be unhidden to take pictures, the sliding mechanism having at least two protruding sides on said cabinet respectively engaging with at least two guides on said cradle for providing limited linear travel of said cradle on said cabinet;
   h. control circuit means for controlling the function of said Bluetooth speaker system; and
   i. means for supplying power to said Bluetooth speaker system;
   j. whereby said Bluetooth speaker system can pair with said mobile device within proximity for providing the hands-free wireless speaker system to said mobile device.

2. The system in accordance with claim 1 further comprising a polycarbonate PVC overlay with a lens aperture aligned with an aperture of said cradle and installed within said recess of said cradle to function as ornamental surface and shock absorption protection for said mobile device.

3. The system in accordance with claim 1 further comprising two independent rubber isolation pads located on said grille and one rubber isolation pad located on a side of said cradle for preventing vibration noise produced by said Bluetooth speaker system resting on a hard surface.

4. The system in accordance with claim 1 wherein said grille includes a plurality of acoustic holes for sound waves to go through.

5. The system in accordance with claim 1 wherein said diaphragm includes a laminated composite of resin impregnated paper top and plastic foam bottom skins.

6. The system in accordance with claim 1 wherein said foam is a double sided soft foam tape.

7. The system in accordance with claim 1 wherein said means for coupling includes an elongated metal plate installed in said recess of said cradle and a pair of lateral and parallel magnet strips located on said cabinet, where the metal plate engages with the magnet strips.

8. The system in accordance with claim 1 wherein said means for supplying power to said Bluetooth speaker system includes a rechargeable battery.

9. A Bluetooth speaker system used in conjunction with a mobile device for providing a hands-free wireless speaker system to the mobile device, the system comprising:
   a. a grille having an interior recess;
   b. a foam installed and secured within said recess of said grille;
   c. a composite speaker diaphragm having a transducer mounted thereto, the diaphragm installed and secured within said recess of said grille and located adjacent to said foam;
   d. a cabinet installed and secured within said recess of said grille and located adjacent to said diaphragm, the cabinet having at least two magnet strips;
   e. a snap cradle having an interior recess for receiving said mobile device;
   f. a metal plate installed in said recess of said snap cradle and located adjacent to said mobile device, the metal plate engaging with said at least two magnet strips for coupling said snap cradle to said cabinet and preventing said snap cradle from coming off said cabinet;
   g. a sliding mechanism for allowing the camera lens of said mobile device to be unhidden to take pictures, the sliding mechanism includes at least two protruding sides of said cabinet respectively engaging with at least two opposite side guides located on said snap cradle for providing limited linear travel of said snap cradle on said cabinet;
   h. a control circuit located within said cabinet for controlling the function of said Bluetooth speaker system; and
   i. power means located and secured on said cabinet for supplying power to said Bluetooth speaker system;
   j. whereby said Bluetooth speaker system can pair with said mobile device within proximity for providing the hands-free wireless speaker system to said mobile device.

10. The system in accordance with claim 9 further comprising a polycarbonate PVC overlay with a lens aperture aligned with an aperture of said snap cradle and installed within said recess of said snap cradle to function as ornamental surface and shock absorption protection for said mobile device.

11. The system in accordance with claim 9 further comprising two independent rubber isolation pads located on said grille and one rubber isolation pad located on a side of said snap cradle for preventing vibration noise produced by said Bluetooth speaker system resting on a hard surface.

12. The system in accordance with claim 9 wherein said grille includes a plurality of acoustic holes for sound waves travel through.

13. The system in accordance with claim 9 wherein said diaphragm includes a laminated composite of resin impregnated paper top and plastic foam bottom skins.

14. The system in accordance with claim 9 wherein said foam is a double sided soft foam tape.

15. A portable Bluetooth speaker system used in conjunction with a mobile device for providing a hands-free wireless speaker system to the mobile device, the system comprising:
   a. a generally rectangular shaped grille having an interior recess;
   b. a soft foam installed and secured within said interior recess of said grille;
   c. a composite speaker diaphragm having a transducer centrally mounted, the diaphragm installed and secured within said interior recess of said grille and located adjacent to said soft foam;

d. a cabinet installed and secured within said interior recess of said grille and located adjacent to said diaphragm, the cabinet having a pair of lateral and parallel magnet strips;
e. a snap cradle having an interior recess for receiving said mobile device;
f. an elongated metal plate installed in said interior recess of said snap cradle and located adjacent to said mobile device, the metal plate engaging with said pair of lateral and parallel magnet strips for coupling said snap cradle to said cabinet and preventing said snap cradle from coming off said cabinet;
g. a longitudinal sliding mechanism for allowing the camera lens of said mobile device to be unhidden to take pictures, the sliding mechanism includes a pair of opposite longitudinally protruding sides of said cabinet respectively engaging with a pair of longitudinally side guides of said snap cradle for providing limited linear travel of said snap cradle on said cabinet;
h. a control circuit located within an upper portion of said cabinet for controlling the function of said Bluetooth speaker system; and
i. a rechargeable battery located and secured at a lower portion of said cabinet for supplying power to said Bluetooth speaker system;
j. whereby said Bluetooth speaker system can pair with said mobile device within proximity for providing the hands-free wireless speaker system to said mobile device.

16. The system in accordance with claim 15 further comprising a polycarbonate PVC overlay with a lens aperture aligned with an aperture of said snap cradle and installed within said interior recess of said snap cradle to function as ornamental surface and shock absorption protection for said mobile device.

17. The system in accordance with claim 15 further comprising two independent rubber isolation pads located on said grille and one rubber isolation pad located on a side of said snap cradle for preventing vibration noise produced by said Bluetooth speaker system resting on a hard surface.

18. The system in accordance with claim 15 wherein said grille includes a plurality of acoustic holes for sound waves travel through.

19. The system in accordance with claim 15 wherein said diaphragm includes a laminated composite of resin impregnated paper top and plastic foam bottom skins.

20. The system in accordance with claim 15 wherein said soft foam is a double sided foam tape.

\* \* \* \* \*